United States Patent
Maki

(10) Patent No.: US 9,813,574 B2
(45) Date of Patent: Nov. 7, 2017

(54) IMAGE PROCESSING APPARATUS AND INFORMATION PROCESSING METHOD

(71) Applicant: CANON KABUSHIKI KAISHA, Tokyo (JP)

(72) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/822,665

(22) Filed: Aug. 10, 2015

(65) Prior Publication Data

US 2016/0050331 A1    Feb. 18, 2016

(30) Foreign Application Priority Data

Aug. 18, 2014 (JP) ................ 2014-166020

(51) Int. Cl.

| H04N 1/00 | (2006.01) |
| G06F 3/12 | (2006.01) |
| G06F 15/00 | (2006.01) |
| G06K 1/00 | (2006.01) |

(52) U.S. Cl.
CPC ....... *H04N 1/00854* (2013.01); *G06F 3/1204* (2013.01); *G06F 3/1239* (2013.01); *G06F 3/1285* (2013.01); *H04N 1/001* (2013.01)

(58) Field of Classification Search
CPC .. H04N 1/00854; H04N 1/001; G06F 3/1239; G06F 3/1204; G06F 3/1285
USPC ........................ 358/1.9, 1.15, 1.13
See application file for complete search history.

(56) References Cited

U.S. PATENT DOCUMENTS

| 2009/0190163 A1* | 7/2009 | Sato ............ H04N 1/00222 358/1.15 |
| 2010/0177341 A1* | 7/2010 | Mihara ............ G06Q 10/06 358/1.15 |
| 2010/0188711 A1* | 7/2010 | Hamada ............ G03G 15/5066 358/3.28 |
| 2014/0123210 A1* | 5/2014 | Tsuchitoi ............ H04L 63/20 726/1 |

FOREIGN PATENT DOCUMENTS

JP    2012-146337 A    8/2012

* cited by examiner

Primary Examiner — Quang N Vo
(74) Attorney, Agent, or Firm — Canon USA, Inc. I.P. Division

(57) ABSTRACT

An image processing apparatus includes a receiving unit configured to receive a request from an information processing apparatus capable of communicating with the image processing apparatus via a network, a determination unit configured to, based on authority information about user's authority included in the request received by the receiving unit and setting item information for identifying a setting item included in the request, determine whether a user has a write authority on the setting item, and a control unit configured to, in a case where the determination unit determines that the user has the write authority on the setting item, control whether to permit a change of a setting value of the setting item, based on a setting value of security policy information associated with the setting item.

15 Claims, 11 Drawing Sheets

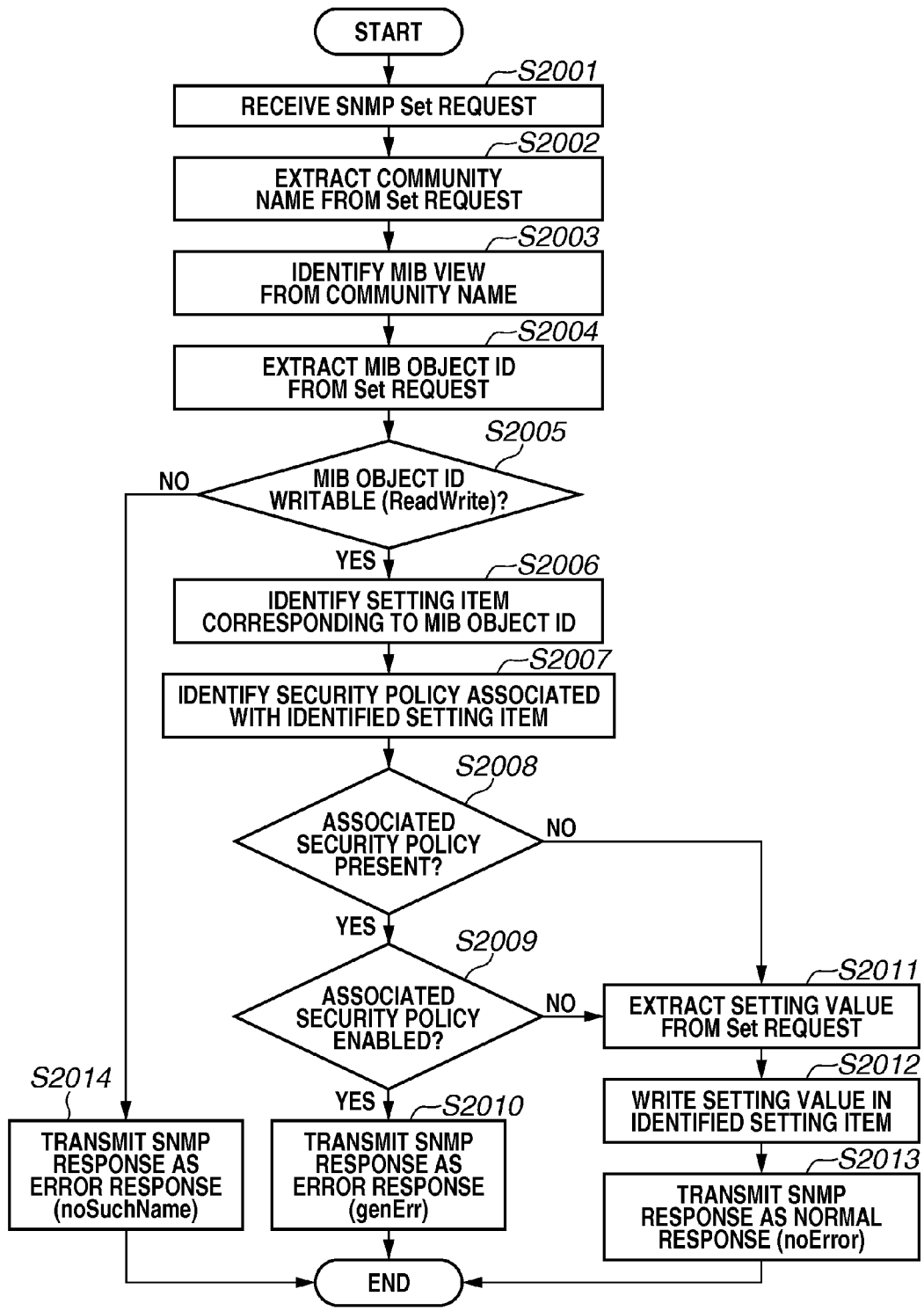

FIG.5

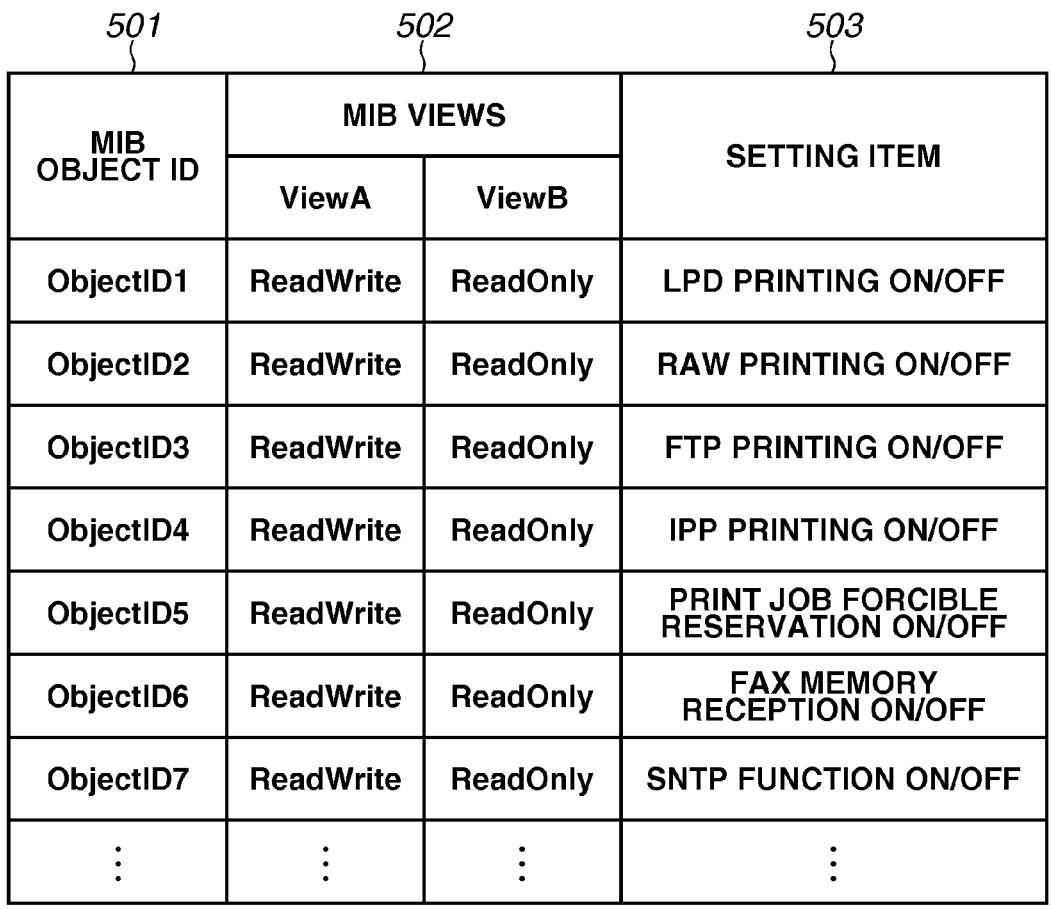

| MIB OBJECT ID | MIB VIEWS | | SETTING ITEM |
| --- | --- | --- | --- |
| | ViewA | ViewB | |
| ObjectID1 | ReadWrite | ReadOnly | LPD PRINTING ON/OFF |
| ObjectID2 | ReadWrite | ReadOnly | RAW PRINTING ON/OFF |
| ObjectID3 | ReadWrite | ReadOnly | FTP PRINTING ON/OFF |
| ObjectID4 | ReadWrite | ReadOnly | IPP PRINTING ON/OFF |
| ObjectID5 | ReadWrite | ReadOnly | PRINT JOB FORCIBLE RESERVATION ON/OFF |
| ObjectID6 | ReadWrite | ReadOnly | FAX MEMORY RECEPTION ON/OFF |
| ObjectID7 | ReadWrite | ReadOnly | SNTP FUNCTION ON/OFF |
| ⋮ | ⋮ | ⋮ | ⋮ |

FIG.7

| SECURITY POLICY 601 | POLICY STATUS 602 | SETTING ITEM 603 | SETTING VALUE WHEN POLICY IS ENABLED 604 |
|---|---|---|---|
| CLOSE ALL OF NETWORK PRINTING PORTS | DISABLED | LPD PRINTING ON/OFF | OFF |
| | | RAW PRINTING ON/OFF | OFF |
| | | FTP PRINTING ON/OFF | OFF |
| | | IPP PRINTING ON/OFF | OFF |
| INHIBIT IMMEDIATE PRINTING OF RECEIVED JOB | ENABLED | PRINT JOB FORCIBLE RESERVATION ON/OFF | ON |
| | | FAX MEMORY RECEPTION ON/OFF | ON |
| OBTAIN TIME FROM TIMESERVER | ENABLED | SNTP FUNCTION ON/OFF | ON |
| ... | ... | ... | ... |

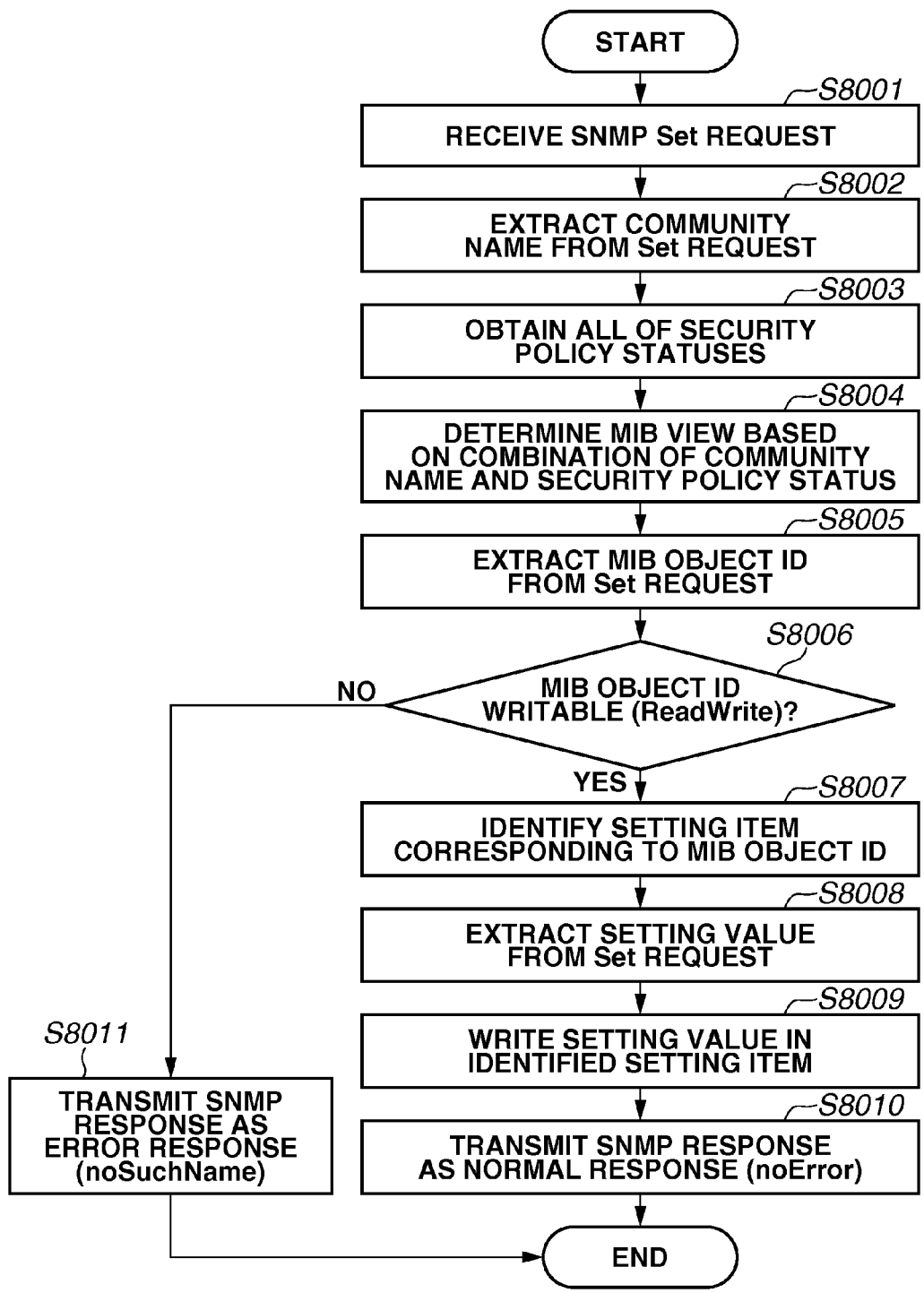

FIG.9

| COMMUNITY NAME | SECURITY POLICY STATUSES | | | MIB VIEW |
|---|---|---|---|---|
| | CLOSE ALL OF NETWORK PRINTING PORTS | INHIBIT IMMEDIATE PRINTING OF RECEIVED JOB | OBTAIN TIME FROM TIMESERVER | |
| "admin" | DISABLED | DISABLED | DISABLED | ViewA |
| | ENABLED | DISABLED | DISABLED | ViewB |
| | DISABLED | ENABLED | DISABLED | ViewC |
| | DISABLED | DISABLED | ENABLED | ViewD |
| | ENABLED | ENABLED | DISABLED | ViewE |
| | DISABLED | DISABLED | ENABLED | ViewF |
| | ENABLED | ENABLED | ENABLED | ViewG |
| "general" | — | — | — | ViewH |

FIG.10

| MIB OBJECT ID | MIB VIEWS ||||||||
| --- | --- | --- | --- | --- | --- | --- | --- | --- |
| | ViewA | ViewB | ViewC | ViewD | ViewE | ViewF | ViewG | ViewH |
| ObjectID1 | ReadWrite | ReadOnly | ReadWrite | ReadWrite | ReadOnly | ReadWrite | ReadOnly | ReadOnly |
| ObjectID2 | ReadWrite | ReadOnly | ReadWrite | ReadWrite | ReadOnly | ReadWrite | ReadOnly | ReadOnly |
| ObjectID3 | ReadWrite | ReadOnly | ReadWrite | ReadWrite | ReadOnly | ReadWrite | ReadOnly | ReadOnly |
| ObjectID4 | ReadWrite | ReadOnly | ReadWrite | ReadWrite | ReadOnly | ReadWrite | ReadOnly | ReadOnly |
| ObjectID5 | ReadWrite | ReadWrite | ReadOnly | ReadWrite | ReadOnly | ReadOnly | ReadWrite | ReadOnly |
| ObjectID6 | ReadWrite | ReadWrite | ReadOnly | ReadWrite | ReadOnly | ReadOnly | ReadWrite | ReadOnly |
| ObjectID7 | ReadWrite | ReadWrite | ReadWrite | ReadOnly | ReadWrite | ReadOnly | ReadOnly | ReadOnly |
| ... | ... | ... | ... | ... | ... | ... | ... | ... |

FIG.11

| MIB OBJECT ID | SETTING ITEM |
|---|---|
| ObjectID1 | LPD PRINTING ON/OFF |
| ObjectID2 | RAW PRINTING ON/OFF |
| ObjectID3 | FTP PRINTING ON/OFF |
| ObjectID4 | IPP PRINTING ON/OFF |
| ObjectID5 | PRINT JOB FORCIBLE RESERVATION ON/OFF |
| ObjectID6 | FAX MEMORY RECEPTION ON/OFF |
| ObjectID7 | SNTP FUNCTION ON/OFF |
| ⋮ | ⋮ |

IMAGE PROCESSING APPARATUS AND INFORMATION PROCESSING METHOD

BACKGROUND OF THE INVENTION

Field of the Invention

The present invention relates to an image processing apparatus for preventing a change not conforming to security policies with respect to a setting value change request for a setting item from an information processing apparatus via a network, an information processing method, and a program.

Description of the Related Art

Japanese Patent Application Laid-Open No. 2012-146337 discusses a method for performing access control on a managed apparatus based on authentication information included in a request from a management apparatus. In the technique discussed in Japanese Patent Application Laid-Open No. 2012-146337, the managed apparatus performs authentication based on the authentication information included in a request received from the management apparatus, counts the number of times of success and the number of times of failure of authentication within a fixed time period, and determines whether the request is to be refused based on the number of times of failure.

However, the technique discussed in Japanese Patent Application Laid-Open No. 2012-146337 cannot prevent a change not conforming to security policies with respect to a setting value change request for a setting item from an information processing apparatus via a network.

SUMMARY OF THE INVENTION

According to an aspect of the present invention, an image processing apparatus includes a receiving unit configured to receive a request from an information processing apparatus capable of communicating with the image processing apparatus via a network, a determination unit configured to, based on authority information about user's authority included in the request received by the receiving unit and setting item information for identifying a setting item included in the request, determine whether a user has a write authority on the setting item, and a control unit configured to, in a case where the determination unit determines that the user has the write authority on the setting item, control whether to permit a change of a setting value of the setting item, based on a setting value of security policy information associated with the setting item.

According to an exemplary embodiment of the present invention, it is possible to prevent a change not conforming to security policies with respect to a setting value change request for a setting item from an information processing apparatus via a network.

Further features of the present invention will become apparent from the following description of exemplary embodiments with reference to the attached drawings.

BRIEF DESCRIPTION OF THE DRAWINGS

FIG. 2 is a flowchart illustrating an example of information processing performed by a multifunction peripheral (MFP) according to a first exemplary embodiment.

FIG. 5 illustrates an example of an information table (2) according to the first exemplary embodiment.

FIG. 7 illustrates an example of an information table (3) according to the first exemplary embodiment.

FIG. 8 is a flowchart illustrating an example of information processing performed by an MFP according to a second exemplary embodiment.

FIG. 9 illustrates an example of an information table (1) according to the second exemplary embodiment.

FIG. 10 illustrates an example of an information table (2) according to the second exemplary embodiment.

FIG. 11 illustrates an example of an information table (3) according to the second exemplary embodiment.

Figure 1A:
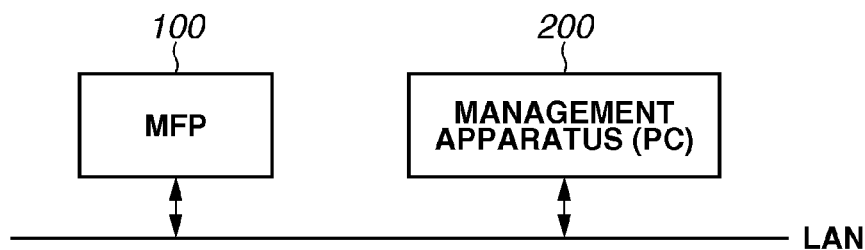
FIGS. 1A and 1B illustrate an example of a system configuration of an image processing system.

DESCRIPTION OF THE EMBODIMENTS (Descriptions of SNMP)

First, Simple Network Management Protocol (SNMP) will be described below as an example of a protocol related to communication between a management apparatus and a managed apparatus according to the following exemplary embodiments.

SNMP is a protocol generally used, via a network, between a management apparatus and a managed apparatus managed by the management apparatus that are connected to the network. In SNMP, the management apparatus may be referred to as an SNMP manager and the managed apparatus may be referred to as an SNMP agent.

The use of SNMP enables the management apparatus to collect information about the managed apparatus and change setting values of the managed apparatus.

For example, if the managed apparatus is a multifunction peripheral (MFP) having a printer function, the management apparatus is able to collect various types of information such as MFP's color/monochrome information, feeding device information, discharge device information, print resolution, supported paper sizes, and supported printing protocols, by using SNMP. Further, the management apparatus is able to change setting values of the managed apparatus, for example, enable or disable printing protocols and change print setting default values.

In SNMP, various types of information and setting values of the managed apparatus are each managed based on information called a Management Information Base (MIB). In MIB, each piece of information and each setting value included in the managed apparatus are referred to as an MIB object, and each MIB object is assigned an MIB object identifier (ID). Therefore, the management apparatus is able to uniquely identify each piece of information and each setting value of the managed apparatus by specifying the MIB object ID.

In SNMP, when the management apparatus collects information of the managed apparatus, the management apparatus transmits a command called a Get request to the managed apparatus. The Get request includes the MIB object ID of information to be collected by the management apparatus. Upon reception of the Get request, the managed apparatus adds, to a response called a Get response, information corresponding to the MIB object ID included in the received Get request, and returns the Get response to the management apparatus. When the management apparatus changes a setting of the managed apparatus, the management apparatus transmits a command called a Set request to the managed apparatus. The Set request includes the MIB object ID of the setting item the management apparatus wants to change, and the setting value to be obtained after change. Upon reception of the Set request, the managed apparatus changes the setting value of the setting item corresponding to the MIB object ID included in the Set request, adds result information (a result code indicating whether the setting value has been changed) to a Get response, and returns the Get response to the management apparatus. In this case, a Get response is also used as a response to a Set request. A Get request and a Set request are collectively referred to as SNMP requests.

In SNMP, access control can be performed on each individual MIB object. In SNMP Version 1, access control on an MIB object can be performed by using a character string called a community name. The community name is predetermined on the managed apparatus side. In some managed apparatuses, the community name can be arbitrarily set by a user, or is fixed. In other managed apparatuses, a plurality of community names can be set. When the managed apparatus performs access control on an MIB object by using a community name, the managed apparatus statically stores the following information. More specifically, the managed apparatus statically prestores information for defining whether each individual MIB object is read-only (hereinafter referred to as ReadOnly) or readable and writable (hereinafter referred to as ReadWrite) for one community name. Hereinafter, the above-described information will be referred to as an MIB view. In other words, in the management in the managed apparatus, one MIB view is associated with one community name. The community name is specified in the above-described SNMP request to be transmitted by the management apparatus. Therefore, upon reception of each of SNMP requests, the managed apparatus is able to determine the MIB view according to the community name specified in these requests. The managed apparatus is able to perform access control on each individual MIB object.

Suppose that a community name "admin" for administrators and a community name "general" for general users are provided in the managed apparatus. In this case, in the managed apparatus, MIB views for administrators that include not only ReadOnly MIB objects but also ReadWrite MIB objects are assigned to the community name "admin." On the other hand, in the managed apparatus, MIB views for general users that include only ReadOnly MIB objects are assigned to the community name "general." This enables performing access control on MIB objects while distinguishing between administrators and general users. In other words, one certain MIB object is regarded as a ReadWrite MIB object for MIB views for administrators, whereas it is regarded as a ReadOnly MIB object for MIB views for general users. In this case, while the management apparatus is able to change a relevant setting value of the managed apparatus if the management apparatus specifies the community name "admin" in a Set request, the management apparatus is unable to change the setting value of the managed apparatus if the management apparatus specifies the community name "general" in the Set request.

In SNMP Version 3, a user name is used instead of a community name in access control on MIB objects. Further, in the management in the managed apparatus, one MIB view is associated with one user name. Therefore, according to SNMP Version 3, after performing authentication of the SNMP request based on the user name and password, the managed apparatus is able to perform access control by using MIB views associated with the user name similar to the case of the community name according to SNMP Version 1.

(Descriptions of Security Policy)

In some cases, security policy settings of an MFP having copy, printer, and FAX functions may be enabled or disabled. In these cases, security policy settings mean settings such as "Close All of Network Printing Ports," "Inhibit Immediate Printing of Received Job," and "Obtain Time from Timeserver." For example, enabling the security policy setting "Close All of Network Printing Ports" means disabling all of network print functions of the MFP and changing all of related setting values so as to close all of printing ports related to the network printing functions.

The above-described security policy settings should be suitably set so as to suit security policies for an office environment in which an MFP is installed. Further, to prevent a setting change not conforming to security policies, it is not desirable to permit even an administrator of each MFP to easily enable or disable security policies and change settings associated with enabled security policies. In this case, security policies should be enabled or disabled and settings associated with security policies should be changed not by the administrator of each MFP but by, for example, a limited administrator who manages security policies of the entire office environment.

From a viewpoint of such securities, when security policies are disabled, the administrator of each MFP is permitted to change all settings of the MFP as usual. However, when security policies are enabled, it is necessary to change and control the range settable by the administrator of each MFP so as not to permit even the administrator of the MFP to change settings associated with the above-described security policies. Such access control needs to be applied also to access control on writing in MIB objects in SNMP.

(System Configuration and Hardware Configuration)

Figure 1B:
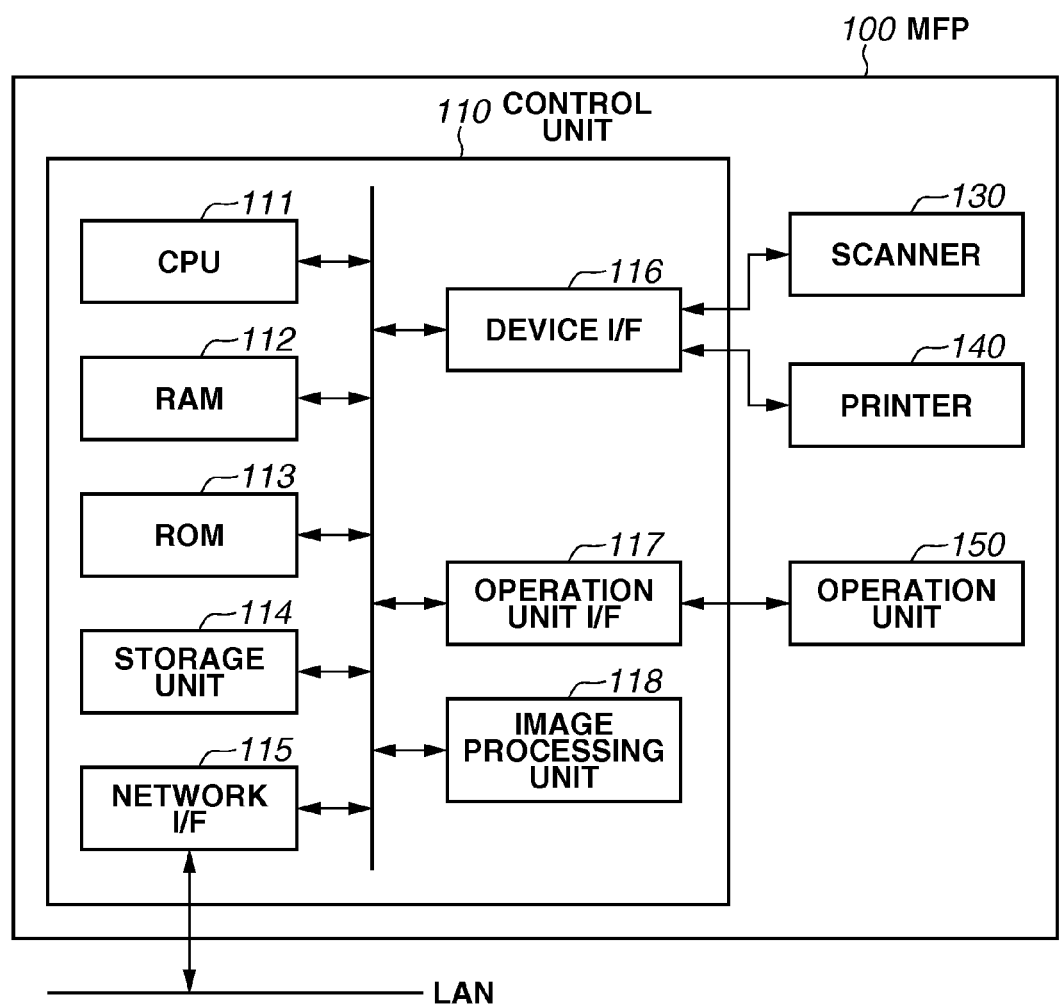

FIG. 1A illustrates an example of a system configuration of an image processing system, and FIG. 1B illustrates an example of a hardware configuration of an MFP.

FIG. 1A illustrates the system configuration of the image processing system. In the image processing system, an MFP 100 and a management apparatus 200 are connected via a local area network (LAN) so as to be capable of communicating with each other. The management apparatus 200 is a personal computer (PC) used when managing the MFP 100 by using SNMP. The MFP 100 is an example of an image processing apparatus.

FIG. 1B illustrates an example of the hardware configuration of the MFP 100. A control unit 110 is connected with a scanner 130 as an image input device and a printer 140 as an image output device, and controls input and output of image information. Meanwhile, the control unit 110 is connected to the LAN and receives a print job via the LAN. A central processing unit (CPU) 111 controls operations of the MFP 100. The CPU 111 operates based on a program stored in a random access memory (RAM) 112. A read only memory (ROM) 113 is a boot ROM storing a boot program of the system. A storage unit 114 stores programs of system software, image data, and programs for controlling operations of the MFP 100. A program stored in the storage unit 114 is loaded into the RAM 112. The CPU 111 controls operations of the MFP 100 based on the program. A network interface (I/F) 115 is connected to the LAN and manages input and output of various types of information via the network. A device I/F 116 connects the scanner 130 and the printer 140 as image input/output devices with the control unit 110, and performs synchronous/asynchronous conversion of image data. An operation unit I/F 117 is an interface for connecting an operation unit 150 and the control unit 110, and outputs image data to be displayed on the operation unit 150 to the operation unit 150. The operation unit I/F 117 also transmits information input from the operation unit 150 by the user to the CPU 111. An image processing unit 118 performs image correction on print data received via the LAN, and performs image correction on image data input and output via the device I/F 116.

The following functions of the MFP 100 and processing of flowcharts (described below) are implemented when the CPU 111 performs processing based on programs stored in the ROM 113 or the storage unit 114.

FIG. 2 illustrates an example of a flowchart for processing performed from when the MFP 100 according to the first exemplary embodiment receives a Set request transmitted by the management apparatus 200 until the MFP 100 transmits a response to the Set request to the management apparatus 200. FIGS. 3 to 7 illustrate examples of related information. The first exemplary embodiment is an exemplary embodiment according to SNMP Version 1.

FIG. 2 is a flowchart illustrating an example of information processing performed from when the MFP 100 receives a Set request transmitted by the management apparatus 200 until the MFP 100 transmits a response to the Set request to the management apparatus 200.

A processing flow will be described below with reference to FIG. 2.

In step S2001, the CPU 111 receives a Set request from the management apparatus 200 via the network I/F 115. Then, the processing proceeds to step S2002.

Prior to descriptions of step S2002 and subsequent steps, the contents of the Set request according to SNMP Version 1 will be described below with reference to FIG. 3.

Figure 3:
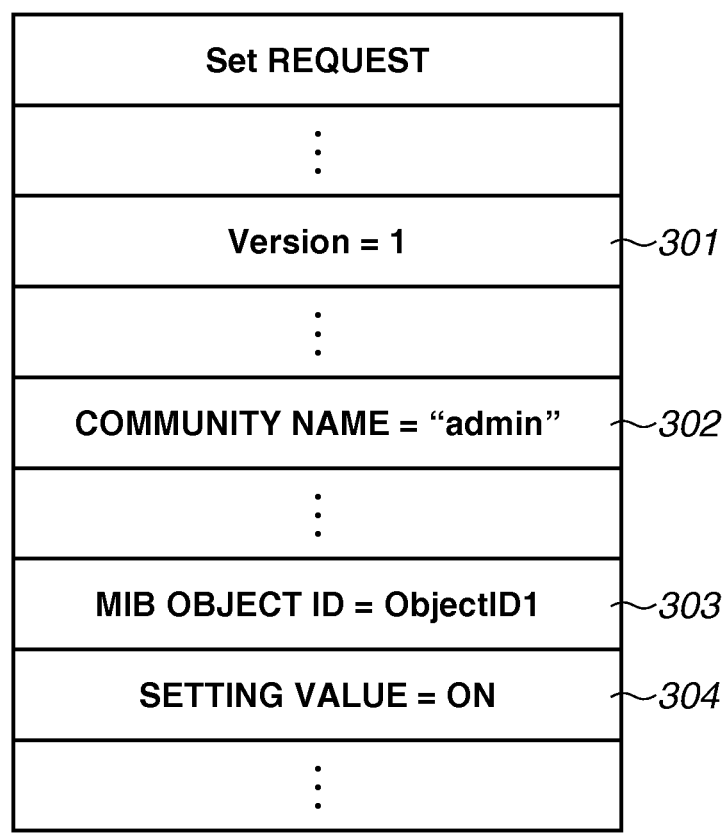
FIG. 3 illustrates an example of contents of a Set request.

FIG. 3 illustrates an example of contents of a Set request according to SNMP Version 1. The Set request includes information such as a version 301, a community name 302, an MIB object ID 303, and a setting value 304. The version 301 is information indicating the SNMP version. In the example illustrated in FIG. 3, "1" is stored in the version 301. The community name 302 is identification information for identifying MIB views (described below). In the example illustrated in FIG. 3, the community name 302 is assigned "admin." The MIB object ID 303 is an identifier preassigned to each setting item of the MFP 100. In the example illustrated in FIG. 3, the MIB object ID 303 is assigned "ObjectID1." Although the MIB object ID is actually an enumeration of numerical values such as "1.3.6.1.2.1.2.2.1.2," the present specification represents the MIB object ID as, for example, "ObjectID1" and "ObjectID2" for the sake of convenience. The setting value 304 is assigned a setting value for the MIB object ID stored in the MIB object ID 303. In the example illustrated in FIG. 3, the setting value 304 is assigned a value "ON."

The community name is an example of authority information related to user's authority. The MIB view is an example of view information. The MIB object ID is an example of setting item information.

The flowchart illustrated in FIG. 2 will be described again below.

In step S2002, the CPU 111 extracts the community name from the Set request. Then, the processing proceeds to step S2003. For example, upon reception of the Set request illustrated in FIG. 3 from the management apparatus 200, the CPU 111 extracts the value of the community name 302, "admin."

In step S2003, the CPU 111 identifies the MIB view from the community name extracted in step S2002. To identify the MIB view, the CPU 111 uses an information table illustrated in FIG. 4, in which the community name is associated with the MIB view.

Figure 4:
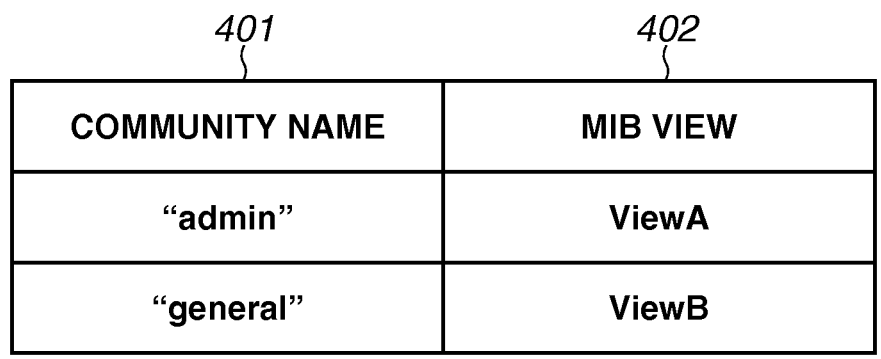
FIG. 4 illustrates an example of an information table (1) according to the first exemplary embodiment.

Referring to FIG. 4, a "Community Name" 401 stores a list of community names identifiable by the CPU 111. An "MIB View" 402 stores information for identifying the MIB view assigned to each community name stored in the "Community Name" 401. The information table illustrated in FIG. 4 is prestored in either the RAM 112 or the storage unit 114.

For example, when the community name "admin" is extracted from the Set request in step S2002, then in step S2003, the CPU 111 identifies "ViewA" as the MIB view corresponding to "admin," from the information table illustrated in FIG. 4. When the community name "general" is extracted in step S2002, then in step S2003, the CPU 111 identifies "ViewB" as the MIB view corresponding to "general."

In step S2004, the CPU 111 extracts the MIB object ID from the Set request. Then, the processing proceeds to step S2005. For example, upon reception of the Set request illustrated in FIG. 3 from the management apparatus 200, the CPU 111 extracts the value of the MIB object ID 303, "ObjectID1."

In step S2005, the CPU 111 determines whether the MIB object ID extracted in step S2004 is writable (ReadWrite) or read-only (ReadOnly). To determine whether the MIB object ID is writable (ReadWrite) or read-only (ReadOnly), the CPU 111 uses an information table illustrated in FIG. 5.

Referring to FIG. 5, an "MIB Object ID" 501 stores a list of all MIB object IDs identifiable by the CPU 111. "MIB Views" 502 store information indicating whether each MIB object ID stored in the "MIB Object ID" 501 is writable (ReadWrite) or read-only (ReadOnly) for each MIB view ("ViewA" and "ViewB" in the example illustrated in FIG. 5). A "Setting Item" 503 stores information indicating the setting item of the MFP 100 that corresponds to each MIB object ID stored in the "MIB Object ID" 501. The information table illustrated in FIG. 5 is prestored in either the RAM 112 or the storage unit 114.

For example, when the MIB view "ViewA" is identified in step S2003 and an MIB object ID "ObjectID1" is extracted in step S2004, the CPU 111 performs determination as follows. More specifically, in step S2005, the CPU 111 determines that the MIB object ID "ObjectID1" is writable (ReadWrite), referring to the information table illustrated in FIG. 5. When the MIB view "ViewB" is identified in step S2003, the CPU 111 determines in step S2005 that the MIB object ID "ObjectID1" is read-only (ReadOnly).

When the CPU 111 determines that the MIB object ID is read-only (ReadOnly) (NO in step S2005), the processing proceeds to step S2014.

In step S2014, the CPU 111 generates an SNMP response and transmits the SNMP response to the management apparatus 200 via the network I/F 115. Then, the processing in the flowchart illustrated in FIG. 2 ends. The SNMP response includes an ErrorStatus field for result code notification. The result code is defined by the SNMP rules. For example, the result code is "noError" for a normal response, or "noSuchName" when a specified MIB object does not exist or writing is performed in a ReadOnly MIB object. In addition, the result code is "badValue" when the Set request is not correct, or "genErr" for other errors. Therefore, in step S2014, the CPU 111 stores "noSuchName" in the ErrorStatus field of an SNMP response to be generated as an error response, and transmits the SNMP response to the management apparatus 200.

On the other hand, when the CPU 111 determines in step S2005 that the MIB object ID is writable (ReadWrite) (YES in step S2005), the processing proceeds to step S2006.

In step S2006, the CPU 111 further identifies the setting item corresponding to the MIB object ID extracted in step S2004, referring to the information table illustrated in FIG. 5. For example, when the MIB object ID "ObjectID1" is extracted in step S2004, the CPU 111 identifies a setting item "LPD Printing ON/OFF" from the "Setting Item" 503 corresponding to "ObjectID1." On the other hand, when an MIB object ID "ObjectID6" is extracted in step S2004, the CPU 111 identifies a setting item "FAX Memory Reception ON/OFF" from the "Setting Item" 503 corresponding to "ObjectID6."

In step S2007, the CPU 111 identifies the security policy associated with the setting item identified in step S2006, referring to an information table illustrated in FIG. 7. The security policies are examples of security policy information.

Prior to descriptions of processing in step S2007 and subsequent steps, a method for setting (enabling) security policies in the MFP 100 will be described below with reference to FIGS. 6 and 7.

An example illustrated in FIG. 6 will be described below.

Figure 6:
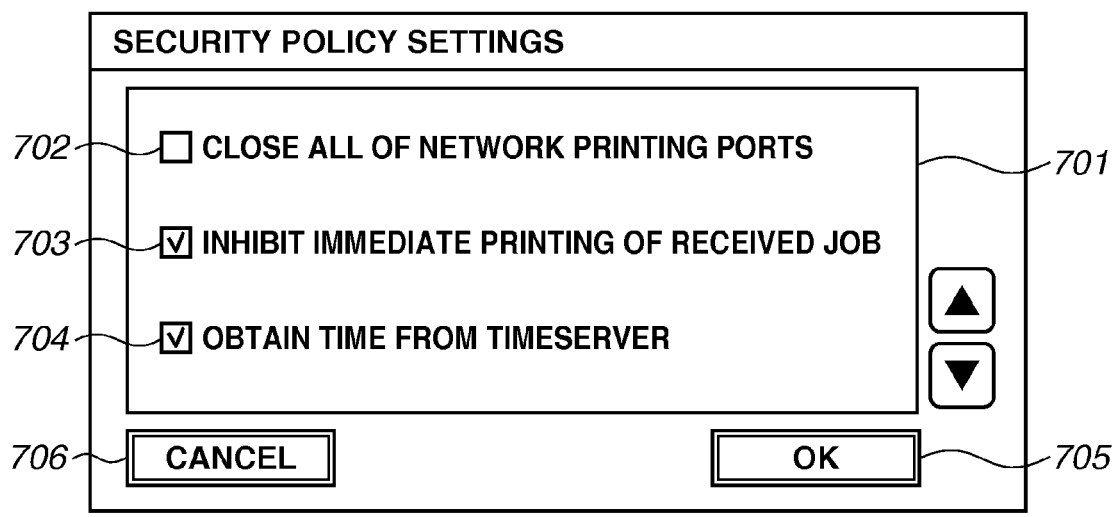
FIG. 6 illustrates an example of a screen for setting security policies.

FIG. 6 illustrates an example of a screen for setting security policies that is to be displayed on the operation unit 150 of the MFP 100. An operator of the MFP 100 sets (enables) security policies by operating this screen.

Referring to FIG. 6, a field 701 is a field for displaying a list of security policies that can be set in the MFP 100. In the example illustrated in FIG. 6, three security policies "Close All of Network Printing Ports," "Inhibit Immediate Printing of Received Job," and "Obtain Time from Timeserver" are displayed. Check boxes 702 to 704 are used to select/deselect and enable/disable the above-described respective security policies. An OK button 705 is used to actually enable the security policies selected with the check boxes 702 to 704. A Cancel button 706 is used to cancel the security policy settings.

An example illustrated in FIG. 7 will be described below.

FIG. 7 illustrate an information table indicating various types of information to be associated with respective security policies.

Referring to FIG. 7, a "Security Policy" 601 stores a list of security policies provided by the MFP 100. A "Policy Status" 602 stores security policy statuses (Enabled/Disabled) of the security policies in the "Security Policy" 601. A "Setting Item" 603 stores one or more setting items required for conforming to each security policy in association with the corresponding security policy in the "Security Policy" 601. A "Setting Value When Policy Is Enabled" 604 stores setting values to be taken by the setting items in the "Setting Item" 603 when the corresponding security policy is enabled.

In the example illustrated in FIG. 7, four setting items "LPD Printing ON/OFF," "RAW Printing ON/OFF," "FTP Printing ON/OFF," and "IPP Printing ON/OFF" are associated with the security policy "Close All of Network Printing Ports." The "Setting Item" 603 prestores these setting items. The "Setting Value When Policy Is Enabled" 604 stores setting values to be taken by these four setting items when this security policy is enabled.

Two setting items "Print Job Forcible Reservation ON/OFF" and "FAX Memory Reception ON/OFF" are associated with the security policy "Inhibit Immediate Printing of Received Job." The "Setting Item" 603 prestores these setting items. The "Setting Value When Policy Is Enabled" 604 stores setting values to be taken by these two setting items when this security policy is enabled.

When the operator of the MFP 100 wants to enable the security policy "Inhibit Immediate Printing of Received Job" by using the "Security Policy Settings" screen illustrated in FIG. 6, the operator performs the following operations. More specifically, the operator checks the check box 703 to select the security policy "Inhibit Immediate Printing of Received Job" and then presses the OK button 705. Being triggered by the press of the OK button 705, the operation unit 150 transmits information about the selected security policy to the CPU 111.

Next, upon reception of the selected security policy, the CPU 111 sets the "Policy Status" 602 of the relevant security policy in the information table illustrated in FIG. 7 to "Enabled." Further, the CPU 111 identifies setting items associated with the relevant security policy, referring to the "Setting Item" 603, and changes the relevant setting values according to the "Setting Value When Policy Is Enabled" 604. For example, when the security policy "Inhibit Immediate Printing of Received Job" is selected, the CPU 111 performs the following processing. More specifically, the CPU 111 identifies two setting items "Print Job Forcible Reservation ON/OFF" and "FAX Memory Reception ON/OFF," referring to the "Setting Item" 603 corresponding to the relevant security policy. Further, to make all of the identified setting items conform to the security policy, the CPU 111 changes the setting values according to the "Setting Value When Policy Is Enabled" 604. For example, since the "Setting Value When Policy Is Enabled" 604 corresponding to the setting item "Print Job Forcible Reservation ON/OFF" is "ON," the CPU 111 changes the setting value of this setting item to "ON."

This completes descriptions of the method for setting (enabling) security policies in the MFP 100.

Processing in step S2007 and subsequent steps will be described again below.

In step S2007, when identifying the security policy, the CPU 111 first searches the "Setting Item" 603 in the information table illustrated in FIG. 7 for the setting item identified in step S2006. When the setting item identified in step S2006 is not found in the list in the "Setting Item" 603, the search result is that there is no security policy associated with the relevant setting item. On the other hand, when the setting item identified in step S2006 is found in the list in the "Setting Item" 603, the CPU 111 further identifies the security policy associated with the relevant setting item from the list in the "Security Policy" 601. For example, when the setting item "LPD Printing ON/OFF" is identified in step S2006, the CPU 111 identifies "Close All of Network Printing Ports" as an associated security policy. When the setting item "FAX Memory Reception ON/OFF" is identified in step S2006, the CPU 111 identifies "Inhibit Immediate Printing of Received Job" as an associated security policy.

Next, the processing proceeds to step S2008. In step S2008, in response to the result of the search in step S2007, the CPU 111 determines whether any associated security policy is present. When the CPU 111 determines in step S2008 that no associated security policy is present (NO in step S2008), the processing proceeds to step S2011. Processing in step S2011 and subsequent steps will be described below. On the other hand, when the CPU 111 determines in step S2008 that an associated security policy is present (YES in step S2008), the processing proceeds to step S2009.

In step S2009, the CPU 111 further determines whether the security policy identified in step S2007 is enabled, referring to the "Policy Status" 602 in the information table illustrated in FIG. 7. For example, when the security policy "Close All of Network Printing Ports" is identified in step S2007, the "Policy Status" 602 corresponding to the relevant security policy is "Disabled" in the example illustrated in FIG. 7. When the security policy "Inhibit Immediate Printing of Received Job" is identified in step S2007, the "Policy Status" 602 corresponding to the relevant security policy is "Enabled" in the example illustrated in FIG. 7.

When the CPU 111 determines in step S2009 that the relevant security policy is disabled (NO in step S2009), the processing proceeds to step S2011. On the other hand, when the CPU 111 determines in step S2009 that the relevant security policy is enabled (YES in step S2009), the processing proceeds to step S2010.

In step S2010, the CPU 111 generates an SNMP response, and transmits the SNMP response to the management apparatus 200 via the network I/F 115. Then, the processing in the flowchart illustrated in FIG. 2 ends. To distinguish from the SNMP response generated in step S2014, the CPU 111 stores "genErr" in the ErrorStatus field of an SNMP response as an error response, and transmits the relevant response to the management apparatus 200.

Processing in step S2011 and subsequent steps will be described below.

In step S2011 (from step S2008 or S2009), the CPU 111 extracts the setting value from the Set request. For example, in the Set request illustrated in FIG. 3, the CPU 111 extracts the value of the setting value 304, "ON."

In step S2012, the CPU 111 writes the setting value extracted in step S2011 in the setting item of the MFP 100 that is identified in step S2006. Then, the processing proceeds to step S2013. For example, when the setting item "LPD Printing ON/OFF" is identified in step S2006 and the setting value "ON" is extracted in step S2011, the CPU 111 writes "ON" as the setting value of "LPD Printing ON/OFF." Then, the processing proceeds to step S2013.

In step S2013, the CPU 111 generates, as a normal response, an SNMP response including "noError" stored in the ErrorStatus field, and transmits the generated SNMP response to the management apparatus 200 via the network I/F 115. Then, the processing in the flowchart illustrated in FIG. 2 ends.

According to the first exemplary embodiment, the CPU 111 performs the following processing according to SNMP Version 1. More specifically, even if writing into an MIB object (setting item) is permitted for a certain community name, the CPU 111 performs control so as to refuse the writing when the security policy associated with the MIB object is enabled. Therefore, for example, when the administrator of the MFP 100 changes an apparatus setting from the management apparatus 200, a setting change not conforming to the security policies can be prevented.

In the first exemplary embodiment, the description has been given assuming that a result code stored in the ErrorStatus field of the SNMP response generated in step S2010 is different from the result code of the SNMP response generated in step S2014. The CPU 111, however, may store the same result code in step S2010 as the result code in step S2014.

In the first exemplary embodiment, the description has been given assuming that the CPU 111 generates the SNMP response as an error response in step S2010. The CPU 111, however, may generate the SNMP response as a normal response (noError).

Further, the CPU 111 may be configured to switch between the above-described SNMP responses to be generated, according to the setting information of the MFP 100 that is stored in the storage unit 114.

In a second exemplary embodiment, the MFP 100 prestores MIB views corresponding to all combinations of security policy statuses (Enabled/Disabled), and determines an MIB view according to a combination of a community name and a security policy status (Enabled/Disabled).

FIG. 8 illustrates an example of a flow of processing performed from when the MFP 100 according to the second exemplary embodiment receives a Set request transmitted by the management apparatus 200 until the MFP 100 transmits a response to the Set request to the management apparatus 200. FIGS. 9 to 11 illustrate examples of related information. Similar to the first exemplary embodiment, the second exemplary embodiment is also an exemplary embodiment according to SNMP Version 1.

FIG. 8 is a flowchart illustrating an example of information processing performed from when the MFP 100 receives a Set request transmitted by the management apparatus 200 until the MFP 100 transmits a response to the Set request to the management apparatus 200.

Steps S8001 to S8002 are respectively similar to steps S2001 to S2002 in the first exemplary embodiment.

In step S8003, the CPU 111 obtains all combinations of security policy statuses (Enabled/Disabled) of the MFP 100. Then, the processing proceeds to step S8004. Security policy statuses of the MFP 100 are assumed to be stored in the storage unit 114. For example, suppose that the user has checked the check boxes 703 and 704 from the "Security Policy Settings" screen illustrated in FIG. 6 to perform security policy settings of the MFP 100. In this case, the CPU 111 obtains a combination of security policy statuses "Close All of Network Printing Ports" (Disabled), "Inhibit Immediate Printing of Received Job" (Enabled), and "Obtain Time from Timeserver" (Enabled).

In step S8004, the CPU 111 determines an MIB view based on a combination of the community name obtained in step S8002 and the security policy status obtained in step S8003. To determine the MIB view, the CPU 111 uses an information table illustrated in FIG. 9.

Referring to FIG. 9, a "Community Name" 901 stores a list of community names identifiable by the CPU 111. A "Security Policy Statuses" 902 store all combinations of security policy statuses corresponding to the "Community Name" 901. An "MIB View" 903 stores information for determining an MIB view to be assigned to each combination of the community name stored in the "Community Name" 901 and the security policy statuses stored in the "Security Policy Statuses" 902. The information table illustrated in FIG. 9 is prestored in either the RAM 112 or the storage unit 114. Security policy statuses are examples of status information of the security policies.

For example, suppose that the community name "admin" is extracted from the Set request in step S8002. In this case, suppose that, in step 8003, the CPU 111 obtains a combination of security policy statuses "Close All of Network Printing Ports" (Disabled), "Inhibit Immediate Printing of Received Job" (Enabled), and "Obtain Time from Timeserver" (Enabled). Then, in step S8004, the CPU 111 determines "ViewF" as the MIB view based on the information table illustrated in FIG. 9. When the community name "general" is extracted in step S8002, then in step S8004, the CPU 111 determines "ViewH" as the MIB view regardless of the security policy statuses.

In step S8005, the CPU 111 extracts the MIB object ID from the Set request. Then, the processing proceeds to step S8006. Processing in step S8005 is similar to that in step S2004 in the first exemplary embodiment. In step S8006, the CPU 111 determines whether the MIB object ID extracted in step S8005 is writable (ReadWrite) or read-only (ReadOnly). To determine whether the MIB object ID is writable (ReadWrite) or read-only (ReadOnly), the CPU 111 uses an information table illustrated in FIG. 10. Referring to FIG. 10, an "MIB Object ID" 1001 stores a list of all MIB object IDs identifiable by the CPU 111. "MIB Views" 1002 store information indicating whether each MIB object ID stored in the "MIB Object ID" 1001 is writable (ReadWrite) or read-only (ReadOnly) for each MIB view ("ViewA" to "ViewH" in the example illustrated in FIG. 10). The information table illustrated in FIG. 10 is prestored in either the RAM 112 or the storage unit 114.

For example, suppose that the MIB view "ViewF" is identified in step S8004 and the MIB object ID "ObjectID1" is extracted in step S8005. In this case, in step S8006, the CPU 111 determines that the MIB object ID "ObjectID1" is writable (ReadWrite), referring to the information table illustrated in FIG. 10. When the MIB view "ViewH" is identified in step S8004, then in step S8006, the CPU 111 determines that the MIB object ID "ObjectID1" is read-only (ReadOnly).

When the CPU 111 determines that the MIB object ID is read-only (ReadOnly) (NO in step S8006), the processing proceeds to step S8011.

Processing in step S8011 is similar to that in step S2014 in the first exemplary embodiment.

On the other hand, when the CPU 111 determines that the MIB object ID is writable (ReadWrite) (YES in step S8006), the processing proceeds to step S8007.

In step S8007, the CPU 111 identifies the setting item corresponding to the MIB object ID extracted in step S8005, referring to an information table illustrated in FIG. 11. Referring to FIG. 11, an "MIB Object ID" 1101 stores a list of all MIB object IDs identifiable by the CPU 111. A "Setting Item" 1102 stores information indicating the setting item of the MFP 100 that corresponds to each MIB object ID stored in the "MIB Object ID" 1101. The information table illustrated in FIG. 11 is prestored in either the RAM 112 or the storage unit 114.

For example, when the MIB object ID "ObjectID1" is extracted in step S8005, the CPU 111 identifies the setting item "LPD Printing ON/OFF" from the "Setting Item" 1102 corresponding to "ObjectID1." Alternatively, when the MIB object ID "ObjectID6" is extracted in step S8005, the CPU 111 identifies the setting item "FAX Memory Reception ON/OFF" from the "Setting Item" 1102 corresponding to "ObjectID6."

In step S8008, the CPU 111 extracts the setting value from the Set request. Then, the processing proceeds to step S8009. Processing in step S8008 is similar to step S2011 in the first exemplary embodiment.

In step S8009, the CPU 111 writes the setting value extracted in step S8009 in the setting item of the MFP 100 that is identified in step S8007. Then, the processing proceeds to step S8010. For example, when the setting item "LPD Printing ON/OFF" is identified in step S8007, and the setting value "ON" is extracted in step S8008, the CPU 111 writes "ON" as the setting value of "LPD Printing ON/OFF." Then, the processing proceeds to step S8010.

Processing in step S8010 is similar to that in step S2013 in the first exemplary embodiment.

As described above, the second exemplary embodiment also enables achieving similar effects to the first exemplary embodiment.

A third exemplary embodiment is an exemplary embodiment according to SNMP Version 3.

Processing by the MFP 100 according to the third exemplary embodiment will be described below centering mainly on differences from the first and the second exemplary embodiments.

When using SNMP Version 3, the community name 302 in the Set request illustrated in FIG. 3 is replaced with a user name and a password.

Further, the "Community Name" 401 or 901 in FIG. 4 or 9, respectively, is replaced with a user name.

Therefore, the processing in steps S2002 and S2003 (see FIG. 2) and processing in steps S8002 and S8003 (see FIG. 8) performed by the CPU 111 are replaced with the following processing.

In the first and the second exemplary embodiments, the CPU 111 extracts the community name from the Set request in step S2002 or S8002. In the third exemplary embodiment, the CPU 111 extracts the user name and the password. Further, in the third exemplary embodiment, the CPU 111 performs authentication based on the user name and the password. If the CPU 111 fails in the authentication based on the user name and the password in step S2002 or S8002, the CPU 111 ignores the Set request. Then, the processing of the flowchart ends. On the other hand, if the CPU 111 succeeds in the authentication based on the user name and the password in step S2002 or S8002, the processing proceeds to step S2003 or S8003, respectively.

In the first and the second exemplary embodiments, the CPU 111 identifies the MIB view from the community name in step S2003 or S8003, with reference to the Set request (see FIG. 3) or the information table (see FIG. 10), respectively. In the third exemplary embodiment, the CPU 111 identifies the MIB view by using the user name extracted from the Set request in step S2002 or S8002.

Subsequent processing is similar to that in the first and the second exemplary embodiments.

As described above, the third exemplary embodiment enables achieving similar effects to the first and the second exemplary embodiments according to SNMP Version 3.

According to the above-described exemplary embodiments, it is possible to prevent an access not conforming to security policies from an apparatus via a network.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-166020, filed Aug. 18, 2014, which is hereby incorporated by reference herein in its entirety.

What is claimed is:

1. An image processing apparatus comprising at least one processor and at least one memory coupled to the at least one processor which acts as:
   a management unit configured to manage write authority information of one of communities defined in Simple Network Management Protocol (SNMP) indicating an authority to change a setting value of a setting item in Management Information Base (MIB);
   a security policy setting unit configured to set whether or not to apply a security policy regarding a setting value in the MIB information an application operated in the image forming apparatus wherein the security policy provides a setting constraint for the setting value in the MIB information and wherein the security policy regarding the setting value in the MIB information is defined separately from the communities defined in SNMP;
   a receiving unit configured to receive a SNMP set request from an information processing apparatus capable of communicating with the image processing apparatus via a network, the SNMP set request including community information and setting item information for identifying a setting item;
   a determination unit configured to, based on the community information included in the SNMP set request received by the receiving unit, the setting item information included in the SNMP set request, and the write authority information regarding the community defined in SNMP managed by the management unit, determine whether a community corresponding to the community information included in the SNMP set request has a write authority on the setting item identified by the setting item information included in the SNMP set request; and
   a control unit configured to, in at least a condition that the determination unit determines that the community has the write authority on the identified setting item and the security policy setting unit sets to apply the security policy which provides a setting constraint regarding a setting value of a setting item regarding the MIB information control whether to permit a change of a setting value of the identified setting item, based on a setting value of security policy associated with the identified setting item after the determination by the determination unit, and
   at least in a condition that the determination unit determines that the community has the write authority on the identified setting item in the MIB information and the security policy setting unit does not set to apply the security policy which provides the setting constraint regarding the setting value, control whether to permit a change of a setting value of the identified setting item in accordance with the authority information in association with the communities defined in SNMP without the security policy.

2. The image processing apparatus according to claim 1, wherein the request received by the receiving unit is a Simple Network Management Protocol (SNMP) request, and
   wherein the at least one processor and the at least one memory further act as a transmitting unit configured to transmit a result of the control by the control unit to the information processing apparatus as an SNMP response.

3. The image processing apparatus according to claim 1, wherein the at least one processor and the at least one memory further act as a writing unit configured to, in a case where a change of a setting value of the setting item is permitted by the control unit, extract the setting value of the setting item from the request and write the extracted setting value in the setting item.

4. The image processing apparatus according to claim 1, wherein the at least one processor and the at least one memory which act as an identification unit configured to identify a Management Information Base (MIB) view based on a community name or a community name according to Simple Network Management Protocol (SNMP) included in the request received by the receiving unit, the MIB view corresponding to the write authority,
   wherein the determination unit determines, according to the MIB view identified by the identification unit and an MIB object identifier (ID) included in the request, whether the community has the write authority on a setting item identified by the MIB object ID.

5. The image processing apparatus according to claim 1, wherein
   the request received by the receiving unit is a Simple Network Management Protocol (SNMP) request,
   the determination unit determines whether a community associated with the received request has a write authority on the setting item according to the SNMP, and
   the control unit controls whether to permit a change of a setting value of the setting item based on a determination by the determination unit in accordance with the SMNP and the security policy set on the image processing apparatus.

6. An information processing method executed by an image processing apparatus, the method comprising:
   managing write authority information in association with community information, the write authority information indicating an authority to change a setting value of a setting item in Management Information Base (MIB) information which is defined in Simple Network Management Protocol (SNMP);
   setting whether or not to apply a security policy regarding communication of an application operated in the image forming apparatus, wherein the security policy provides a setting constraint for the setting value regarding the MIB information;
   receiving a set SNMP request from an information processing apparatus capable of communicating with the image processing apparatus via a network, the set SNMP request including the community information and setting item information for identifying a setting item;

determining, based on the community information included in the set SNMP request received by the receiving, the setting item information included in the set SNMP request, and the managed write authority information, whether a community corresponding to the community information included in the set SNMP request has a write authority on the setting item identified by the setting item information of the MIB information; and controlling, in at least a condition that it is determined that the community has the write authority defined in SNMP on the identified setting item and setting to apply the security policy regarding communication of the application which provides a setting constraint regarding a setting value of a setting item regarding the communication protocol, whether to permit a change of a setting value of the identified setting item, based on a setting value of security policy associated with the identified setting item, and at least in a condition that it is determined that the community has the write authority defined in SNMP on the identified setting item and does not set to apply the security policy which provides the setting constraint regarding the setting value, control whether to permit a change of a setting value of the identified setting item without the security policy.

7. An image processing apparatus, which is configured to communicate with an information processing apparatus, comprising at least one hardware processor which acts as:

a management unit to manage write authority information in association with community information managed by Simple Management Network Protocol (SNMP), wherein the write authority information defines authority of a community corresponding to the community information regarding SNMP to change a setting;

a receiving unit to receive a SNMP set request from the information processing apparatus, wherein the SNMP set request includes the community information and information regarding the setting in Management Information Base (MIB) information defined in SNMP;

a security policy setting unit to set whether or not to apply a security policy regarding SNMP operated in the image forming apparatus, wherein the security policy provides a setting constraint of the setting regarding in the MIB information defined in SNMP which is related to the communication of the application;

a control unit to, based on the community information in the SNMP set request received by the receiving unit, the information regarding the setting in the received SNMP set request, the write authority information managed by the management unit, and the security policy, control the image forming apparatus whether or not to allow the community corresponding to the community information in the SNMP set request to change the setting in the MIB information defined in SNMP in a case where the security policy setting unit sets to apply the security policy regarding SNMP, which provides the setting constraints regarding the setting of the MIB information in SNMP, and to, based on the community information in the SNMP set request received by the receiving unit, the information regarding the setting in the received SNMP set request, the write authority information managed by the management unit, and without the security policy regarding SNMP, control the image forming apparatus whether or not to allow the community corresponding to the community information in the SNMP set request to change the setting of the MIB information in SNMP in a case where the security policy setting unit does not set to apply the security policy regarding the communication of SNMP which provides the setting constraints regarding the setting of the MIB information in SNMP wherein the security policy regarding the setting value in the MIB information is defined separately from the communities defined in SNMP.

8. The image processing apparatus according to claim 7, the security policy setting unit sets at least one of the communications of applications including whether or not to allow opening a printing port, whether or not to allow changing time information on the image forming apparatus with reference time information obtained from a network, and whether or not to allow printing output without user's confirmation as the security policy regarding communication of the application.

9. An image processing apparatus according to claim 8, wherein in the security policy, a different setting regarding whether to allow opening a printing port can be set for each of network printing protocols.

10. An image processing apparatus according to claim 8, wherein in the security policy, a different setting regarding whether or not to allow printing output without user's confirmation can be set for each of image forming types.

11. An information processing method executed by an image processing apparatus which is configured to communicate with an information processing apparatus, the method comprising:

managing write authority information in association with community information managed by Simple Management Network Protocol (SNMP), wherein the write authority information defines authority of a community corresponding to the community information regarding SNMP to change a setting;

receiving a SNMP set request from the information processing apparatus, wherein the SNMP set request includes the community information and information regarding the setting in Management Information Base (MIB) information defined in SNMP;

setting whether or not to apply a security policy regarding SNMP operated in the image forming apparatus, wherein the security policy provides a setting constraint of the setting regarding in the MIB information defined in SNMP which is related to the communication of the application;

controlling, based on the community information in the SNMP set request received, the information regarding the setting in the received SNMP set request, the write authority information managed, and the security policy, control the image forming apparatus whether or not to allow the community corresponding to the community information in the SNMP set request to change the setting in the MIB information defined in SNMP in a case where the security policy regarding SNMP is applied according to the setting, which provides the setting constraints regarding the setting of the MIB information in SNMP, and to, based on the community information in the SNMP set request received, the information regarding the setting in the received SNMP set request, the write authority information managed, and without the security policy regarding SNMP, control the image forming apparatus whether or not to allow the community corresponding to the community information in the SNMP set request to change the setting of the MIB information in SNMP in a case where the setting does not set to apply the security policy regarding the communication of SNMP which provides the setting constraints regarding the setting of the MIB information in SNMP wherein the security policy regarding the setting value in the MIB information is defined separately from the communities defined in SNMP.

12. The method according to claim 11, further comprising setting at least one of the communications of applications including whether or not to allow opening a printing port, whether or not to allow changing time information on the image forming apparatus with reference time information obtained from a network, and whether or not to allow printing output without user's confirmation, as the security policy regarding communication of the application.

13. The method according to claim 11, wherein the communication protocol is SNMP and the setting is defined in accordance with SNMP and the user corresponds to a community name in the SNMP.

14. The method according to claim 12, wherein in the security policy, a different setting regarding whether to allow opening a printing port can be set for each of network printing protocols.

15. The method according to claim 12, wherein in the security policy, a different setting regarding whether or not to allow printing output without user's confirmation can be set for each of image forming types.

* * * * *